United States Patent
Najatian et al.

(10) Patent No.: US 9,369,226 B2
(45) Date of Patent: Jun. 14, 2016

(54) METHOD AND APPARATUS FOR CONTROLLING PERFORMANCE IN A RADIO NODE

(75) Inventors: Alireza Najatian, Uppsala (SE); Youping Su, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 164 days.

(21) Appl. No.: 14/342,156

(22) PCT Filed: Sep. 8, 2011

(86) PCT No.: PCT/SE2011/051090
§ 371 (c)(1),
(2), (4) Date: Feb. 28, 2014

(87) PCT Pub. No.: WO2013/036182
PCT Pub. Date: Mar. 14, 2013

(65) Prior Publication Data
US 2014/0219144 A1    Aug. 7, 2014

(51) Int. Cl.
*H04J 3/06* (2006.01)
*H04J 3/14* (2006.01)
(Continued)

(52) U.S. Cl.
CPC .............. *H04J 3/14* (2013.01); *H04B 7/0671* (2013.01); *H04B 7/2643* (2013.01); *H04B 17/0085* (2013.01); *H04B 17/11* (2015.01)

(58) Field of Classification Search
CPC .. H04B 7/2643; H04B 17/11; H04B 17/0085; H04B 7/0671; H04B 3/14
USPC ................... 370/304, 324, 350, 395.62, 484, 370/503–520
See application file for complete search history.

(56) References Cited

U.S. PATENT DOCUMENTS 3,562,432 A * 2/1971 Gabbard .............. H04B 7/2126
370/324
2009/0080325 A1   3/2009 Parnaby
(Continued)

FOREIGN PATENT DOCUMENTS

CN   WO 2011050692 A1 *  5/2011  ............ H04W 24/06
EP         1 355 509 A2     10/2003
(Continued)

OTHER PUBLICATIONS

Written Opinion of the International Search Authority dated Sep. 12, 2012 for Internatioal Application Serial No. PCT/SE2011/051564, International Filing Date: Dec. 21, 2011 consisting of 7-pages.
(Continued)

*Primary Examiner* — Mang Yeung
(74) *Attorney, Agent, or Firm* — Christopher & Weisberg, P.A.

(57) ABSTRACT

Controlling performance in a Time Division Duplex (TDD) radio node is provided. The TDD radio node having multiple parallel branches and antennas for radio transmission of signals propagating through a transmit chain in each of the branches before emission from the antennas. A signal generator generates a signal that propagates through each branch. A signal tapper taps the signal from each of the branches after the transmit chain. A control unit determines a timing of the tapped signal from each of the branches, and monitors timing alignment of the branches based on the determined timing of tapped signals. If it is discovered that there is a timing misalignment between the branches that exceeds a preset acceptable limit, a transmission delay can be adjusted for at least one of the branches to reduce the misalignment.

20 Claims, 5 Drawing Sheets

(51) Int. Cl.
*H04B 7/06* (2006.01)
*H04B 17/00* (2015.01)
*H04B 7/26* (2006.01)
*H04B 17/11* (2015.01)

(56) References Cited

U.S. PATENT DOCUMENTS

| | | |
|---|---|---|
| 2009/0318089 A1 | 12/2009 | Stratford et al. |
| 2010/0246457 A1* | 9/2010 | Zhou .................... H04B 7/0434 370/294 |
| 2011/0044188 A1 | 2/2011 | Luo et al. |
| 2012/0202442 A1* | 8/2012 | Li ....................... H04W 56/001 455/115.2 |

FOREIGN PATENT DOCUMENTS

| | | |
|---|---|---|
| EP | 1 469 616 A1 | 10/2004 |
| EP | 1 983 659 A2 | 10/2008 |
| EP | 2 226 955 A2 | 9/2010 |
| WO | 0040050 A1 | 7/2000 |
| WO | 2010123229 A2 | 10/2010 |

OTHER PUBLICATIONS

International Search Report and Written Opinion dated Jul. 2, 2012 for International Application Serial No. PCT/SE2011/051090, International Filing Date: Sep. 8, 2011 consisting of 11-pages.

International Search Report dated Sep. 12, 2012 for International Application Serial No. PCT/SE2011/051564, International Filing Date: Dec. 21, 2011 consisting of 4-pages.

* cited by examiner

METHOD AND APPARATUS FOR CONTROLLING PERFORMANCE IN A RADIO NODE

TECHNICAL FIELD

The present disclosure relates generally to a method and an apparatus for controlling performance in a radio node using Time Division Duplex (TDD) and having multiple output branches for radio transmission of signals in a cellular network.

BACKGROUND

A technology known as "Long-Term Evolution, LIE" has been developed for radio communication in cellular networks. In LTE, different modes of communication can be used for radio nodes in a cellular network such as Frequency Division Duplex (FDD), TDD and half duplex. In this description, the term "radio node" represents any of a base station belonging to a cellular network and a mobile terminal operated by a user.

In TDD, a single physical channel can be utilized for both uplink and downlink transmissions which must be separated in time, in a communication between a base station and a mobile terminal. Therefore, the participating radio nodes are required to switch between transmit mode and receive mode according to a predefined radio frame scheme, thus avoiding that uplink and downlink transmissions occur on that physical channel simultaneously. An example of such a scheme is illustrated in FIG. 1. In this example, a radio frame 100 of 10 ms duration comprises ten sub-frames 0-9 of 1 ms duration each, which can be used for either uplink or downlink transmissions on the same physical channel in a communication. In the Third Generation Partnership Project (3GPP), a number of different uplink-downlink configurations have been defined for sub-frames 0-9 in a radio frame. In FIG. 1, some exemplary arrows are shown within the sub-frames to indicate whether a sub-frame is scheduled for uplink or downlink.

In this figure, an uplink transmission in sub-frame 4 is followed by a downlink transmission in sub-frame 5, implying that the base station must switch from receive mode in sub-frame 4 to transmit mode in sub-frame 5. The mobile station must correspondingly switch from transmit mode in sub-frame 4 to receive mode in sub-frame 5. A single sub-frame 1 is even divided into a field 102 for a downlink Pilot Time Slot, DwPTS, and a field 104 for an uplink Pilot Time Slot, UpPTS, the fields 102 and 104 being separated by a field 106 denoted Guard Period, GP allowing for the above switch and transition of communication modes. This example thus illustrates that both nodes must switch between transmit mode and receive mode in a very accurate and synchronized manner to avoid collisions and disturbances on the physical channel used, particularly between uplink and downlink transmissions.

Different radio nodes, including both base stations and mobile terminals, transmitting in a cellular network are typically required to be mutually synchronized by locking to a common precise reference, such as a pulse emitted from a Global Positioning System (GPS), in order to use a TDD radio frame scheme. It is also common that multiple parallel transmit branches and antennas are employed in a radio node, e.g. to achieve benefits such as diversity, improved data bit rate and/or enhanced signal reception quality, where the same signals are transmitted in parallel over two or more branches and antennas. Some well-known examples of technologies employing parallel transmit branches and antennas are transmit (TX) diversity, Multiple-Input Multiple-Output (MIMO), Beam Forming (BF) and spatial multiplexing. In order to achieve improved performance by using such multiple branches, it is required that the signals emitted from the different antennas are aligned in time, typically also in phase and amplitude.

A simplified example of using multiple transmit branches and antennas in a radio node is schematically illustrated in FIG. 2. The shown radio node 200 may be a base station or a mobile terminal. Any commonly used amplifiers and filters are omitted in this figure for clarity.

The radio node 200 comprises a digital radio part 202 and two branches 204 and 206, denoted A and B, which are used for both transmission and reception of signals through respective antennas 204d and 206d depending on the mode of communication which can be switched as said above. In the digital radio part 202, a signal generator 202a generates signals which are injected to and transmitted over both branches A and B. The signal generator 202a conventionally includes a digital-to-analogue converter, a modulator and an amplifier, which are not shown in this figure for simplicity. The generated signals are first fed to transmit delay buffers 202b and 202c in the radio part 202, which can be pre-configured to delay the signal in time individually in order to calibrate the radio node for output on the two branches and simultaneous emission from the respective antennas 204d, 206d.

The signals issued from digital radio part 202 are injected to respective transmitters 204a and 206a in the branches A and B, and further pass through a mode switch 204c, 206c in each branch. The mode switch 204c, 206c basically operates to let generated signals pass through towards respective antennas 204d, 206d when in transmit mode, as indicated by full arrows, and to let signals received by antennas 204d, 206d pass through in the opposite direction towards receivers 204b and 206b when in receive mode, as indicated by dashed arrows. The mode switch 204c, 206c is thus controlled to connect the antennas 204d, 206d to either transmitters 204a and 206a or to receivers 204b and 206b, depending on the mode of communication being either transmit or receive mode, in accordance with the prevailing radio frame scheme of sub-frames. The configuration of such mode switches is well known and not necessary to describe in more detail here.

When using such multiple transmit branches and antennas, it is important that the signals are emitted at the same time from the antennas 204d and 206d in transmit mode, otherwise reception of signals on one antenna may be disturbed by transmission of signals from the other antenna, which will be explained in more detail below with reference to FIG. 3 and FIG. 4. Simultaneous emission is also needed to achieve the intended benefit of using parallel antennas. Even though only two antennas are shown in FIG. 2, the above-described arrangement is also applicable for any number of transmit branches and antennas which need to be synchronized in time to avoid misalignment errors.

FIG. 3 comprises a curve 300 that illustrates how output power for transmission from an antenna of a radio node, such as antennas 204d and 206d in the above example, changes over time when switching between receive and transmit modes. First, the output power is at an OFF level when in receive mode. Then at a time t1, transmission is turned on to switch into transmit mode and the output power rises up to an ON level which is reached at a time t2. The period from t1 to t2 is thus a transit period from receive mode to transmit mode. Correspondingly, at a time t3, transmission is turned off to switch back again into receive mode and the output power decreases down to the OFF level which is reached at a time t4. The period from t3 to t4 is thus a transit period from transmit mode to receive mode.

The transit periods t1-t2 and t3-t4 are needed to ramp up and down, respectively, the output power in the radio node according to the shown curve, which can be done during guard periods between uplink and downlink transmissions in the radio frame when no transmission is allowed from either side, such as in the GP 106 shown in FIG. 1. However, if there is a misalignment between two or more parallel transmit branches in a radio node, e.g. the ones shown in FIG. 2, the reception of signals in one branch may be disturbed, or interfered, by a transmission from another branch, thus causing disturbances in the communication. Such a misalignment between transmit branches may also cause severe equipment damages when one branch is still in receive mode and its antenna receives a very strong signal from a closely located antenna of another branch having just switched to transmit mode, or ramping up to transmit mode. The received signal strength in that case exceeds by many times a normal signal strength of signals received from an opposite radio node in normal communication between a base station and a mobile terminal.

This is schematically illustrated by an example in FIG. 4 where a radio node comprises two radio units having two transmit branches each. In this example, transmission from one branch 1B of a first radio unit is delayed in relation to transmission from another branch 1A of the first radio unit, and also in relation to transmission from two branches 2A and 2B of a second radio unit arranged to transmit the same signals, thus causing a misalignment error of Δt between transmission from branch 1B and transmission from the other branches 1A, 2A and 2B. This misalignment error results in interference from branches 1A, 2A and 2B, while ramping up to the transmit mode during period t1-t2, to branch 1B being still in receive mode during period t1-t2, as indicated by a dashed arrow on the left side in FIG. 4. Correspondingly, branch 1B ramps down from the transmit mode after t4 causing interference to branches 1A, 2A and 2B having already entered receive mode at t4, as indicated by another dashed arrow on the right side in FIG. 4.

It is currently a requirement in 3GPP that the misalignment error between two parallel transmit branches should not exceed a preset limit of 65 nanoseconds to avoid communication disturbances or equipment damages. Therefore, radio nodes are carefully calibrated, e.g. by means of transmit delay buffers coupled to the transmit branches, to fulfill the above requirement. It may still happen that a transmit branch can change its signal propagation time, e.g. due to damage or ageing of components, or malfunction of software, such that the misalignment error exceeds the preset limit which typically goes unnoticed, still resulting in a gradual degradation of performance in the radio node. This performance degradation may involve decreased accuracy in signal detection, decreased data throughput, increased interference, reduction of radio coverage, severe equipment damages, and so forth.

SUMMARY

It is an object of the invention to address at least some of the problems and issues outlined above. It is possible to achieve these objects and others by using a method and an apparatus as defined in the attached independent claims.

According to one aspect, a method is provided for controlling performance in a radio node using Time Division Duplex (TDD) and having multiple parallel branches and antennas for radio transmission of signals propagating through a transmit chain in each of the branches before emission from the antennas. A signal is generated that propagates through the transmit chain in each of the branches. The signal is tapped from each of the branches after the transmit chain. A timing of the tapped signals is determined by determining a timing of the tapped signal from each of the branches. A timing alignment of the branches in the radio node is monitored based on the determined timing of the tapped signals. Thereby, any unacceptable timing misalignment between the branches can be easily discovered by performing the above method, and any degradation of performance or equipment damages in the radio node due to such misalignment between parallel branches can thus be avoided.

According to another aspect, a radio node is provided that is configured to use Time Division Duplex (TDD) and has multiple parallel branches and antennas for radio transmission of signals propagating through a transmit chain in each of the branches before emission from the antennas. The radio node includes a signal generator adapted to generate a signal that propagates through the transmit chain in each of the branches. A signal tapper is included that is adapted to tap the signal from each of the branches after the transmit chain. A control unit is included that is adapted to determine a timing of the tapped signals by determining a timing of the tapped signal from each of the branches. The control unit is further adapted to monitor a timing alignment of the branches in the radio node based on the determined timing of the tapped signals.

The above method and apparatus may be configured and implemented according to different optional embodiments. In one possible embodiment, the radio node adjusts a transmission delay of at least one of the branches if the determined timing of tapped signals indicates that a timing misalignment between the multiple parallel branches exceeds a preset limit. Adjusting the transmission delay may comprise altering a transmit delay buffer coupled to the at least one of the branches. If the timing misalignment still exceeds the preset limit after the adjusting of transmission delay, the radio node may shut down the at least one of the branches. Further, the radio node may issue an alarm when the timing misalignment exceeds the preset limit.

In another possible embodiment, the signal is tapped from the branches by Voltage Stand Wave Radio (VWSR) supervision equipment coupled to each of the branches and producing a voltage difference between forward radio power and reverse radio power detected at each of the branches. It is an advantage with this embodiment that the VSWR supervision equipment is a developed and available standard entity. In yet another possible embodiment, the generated signal is a test signal which is tapped from each of the branches by antenna calibration equipment being coupled to each of the branches and feeding the tapped test signal from each branch through a receive chain in one of the branches to a control unit. An advantage with this embodiment is that if the radio node already has such an antenna calibration equipment installed, no further hardware is needed.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable improved performance in a TDD radio node by monitoring timing alignment in multiple parallel branches and antennas for radio transmission of signals. In this solution, a generated signal that propagates through the transmit chain in each of the branches is tapped from each of the branches and a timing of the tapped signal is determined for each of the branches. Thereby, timing alignment of the branches can be monitored based on the determined timing of each tapped signal, e.g. to discover if there is any timing misalignment between the branches that exceeds a preset limit.

Figure 5:
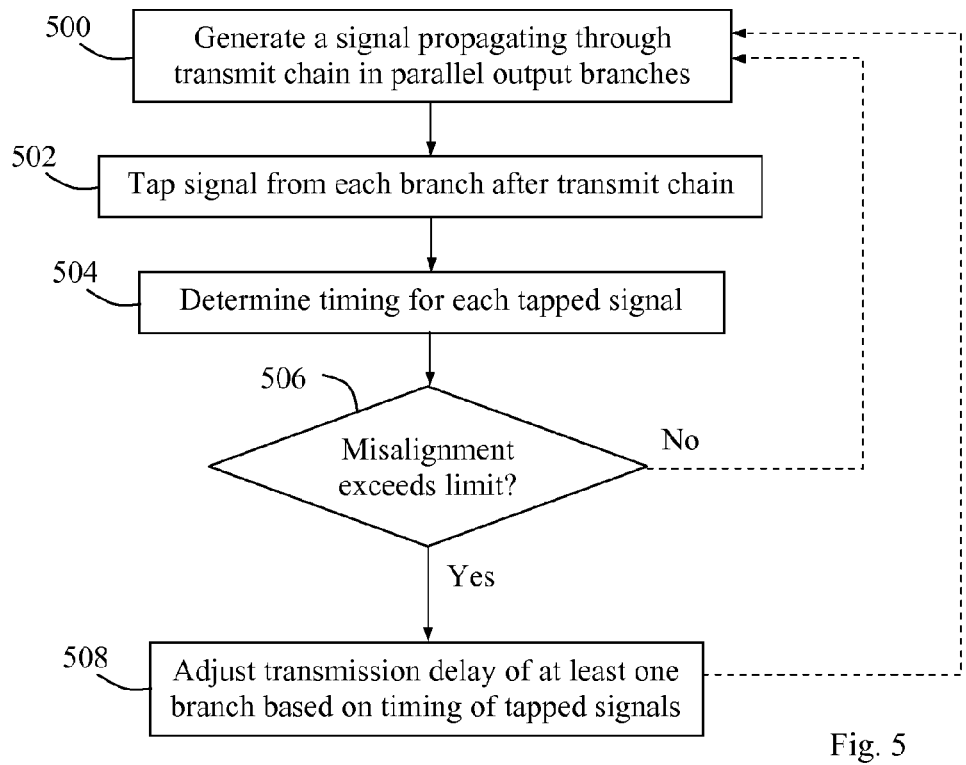
FIG. 5 is a flow chart illustrating a procedure in a radio node, according to some possible embodiments.

An example of how this solution can be put into practice for controlling performance in a TDD radio node, will now be described in terms of actions executed by the radio node, with reference to the flow chart in FIG. 5. The radio node uses TDD and has multiple parallel branches and antennas for radio transmission of signals which propagate through a transmit chain in each of the branches before emission from the antennas, e.g. in the manner illustrated in FIG. 2. FIG. 5 thus illustrates a procedure for checking timing alignment in the multiple branches. It should be noted that any number of multiple parallel branches may be used in this solution, and that the radio node may be a base station or a mobile station, often also called a User Equipment, UE.

In a first action 500, a signal is generated in the radio node, such that the generated signal propagates in parallel through the transmit chain in each of the branches. Due to variations and differences in the components involved in the transmit chain of the respective branches, the signal may arrive at the respective antennas for emission at slightly different times causing a timing misalignment between the branches, as described in some detail above. In order to detect any such timing misalignment, the above signal is tapped from each of the branches basically at a position after the transmit chain, in a next action 502.

In a further action 504, the radio node determines timing of the tapped signals by determining a timing of the tapped signal from each of the branches. This timing may be determined in relation to a reference clock or the like. For example, such a reference clock may be started at the same time as the signal is generated in action 500, or the above-mentioned GPS pulse may be used as reference.

In a further action 506, the radio node determines whether the timing of the tapped signal from each of the branches indicates a misalignment between the branches that exceeds a preset acceptable limit, e.g. the above-mentioned limit of 65 nanoseconds stipulated by 3GPP. If the determined timing of tapped signals indicates that a timing misalignment between the branches exceeds the preset limit, a transmission delay of at least one of the branches is adjusted in an action 508. For example, adjusting the transmission delay may comprise altering a transmit delay buffer coupled to each of the at least one of the branches, such as the transmit delay buffers 202b and 202c shown in FIG. 2, in order to calibrate the radio node in accordance with the above timing measurement.

If it is determined in action 506 that no timing misalignment exceeds the preset limit, the process is completed and may at some point return to action 500, as indicated by a dashed arrow from 506, for making another timing measurement according to actions 500-506. This process of checking timing alignment in the multiple branches may be triggered according to a preset scheme, e.g. at regular intervals such as once a day or week, or by detecting deteriorated performance in the radio node. Further, the radio node may issue an alarm when the timing misalignment exceeds the preset limit, e.g. to an operation and maintenance centre or the like.

If the timing misalignment still exceeds the preset limit after having adjusted transmission delay in action 508, the at least one of the branches may be deemed out of order and may thus be shut down for repairs or replacement. Thus, the process for making another timing measurement according to actions 500-506 may be performed after action 508, as indicated by another dashed arrow from 508, to find out if the adjustment has resulted in acceptable timing misalignment of less than the preset limit. For example, the faulty branch may be shut down after making a preset number of failed attempts to adjust the transmission delay, as of action 508.

Figure 6:
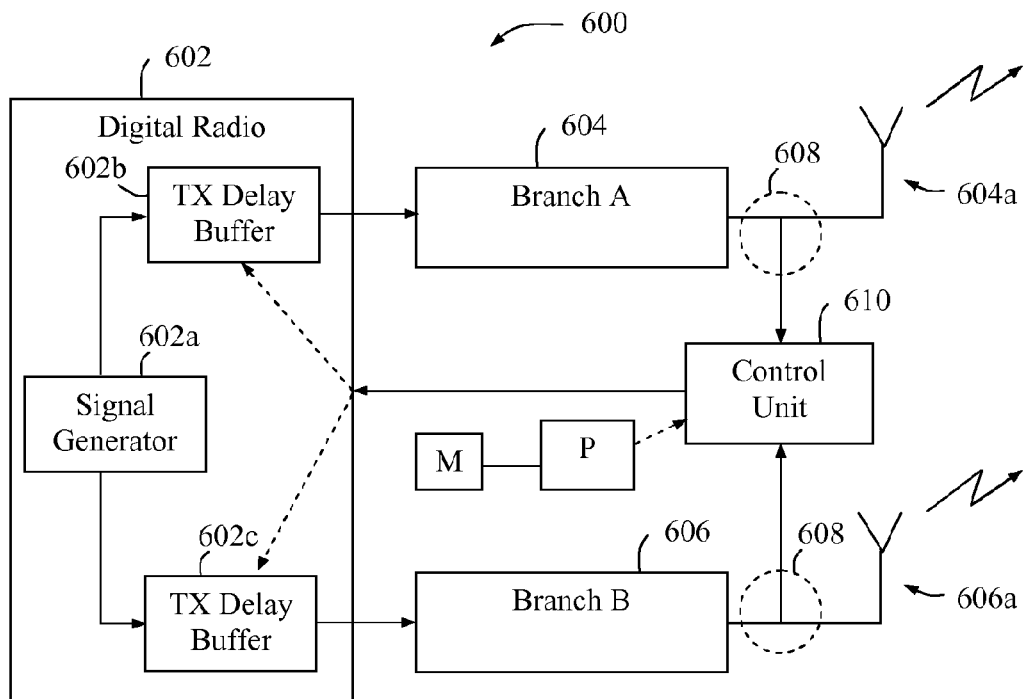
FIG. 6 is a block diagram illustrating an example of a radio node, according to further possible embodiments.

FIG. 6 illustrates how a radio node can be configured to accomplish the above-described solution for controlling performance therein. Again, the radio node 600 is configured to use TDD for communication and has multiple parallel branches 604, 606 and antennas 604a, 606a for radio transmission of signals propagating through a transmit chain in each of the branches before emission from the antennas. In this example, only two branches are shown although the solution is not limited thereto, as also mentioned above. The transmit chain in each branch includes at least a transmitter and a mode switch, which are not shown in this figure for simplicity, such as the transmitters 204a, 206a and mode switches 204c, 206c shown in FIG. 2. In practice, such transmit chains typically also include further components such as amplifiers and filters.

Figure 1:
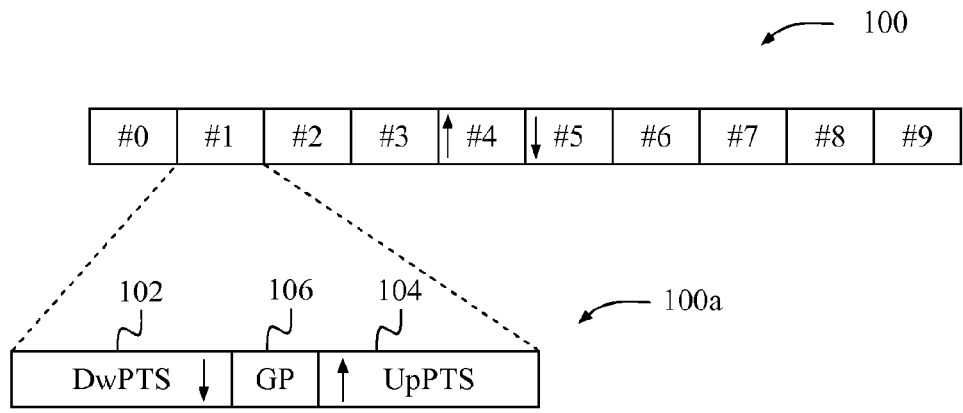
FIG. 1 is a diagram illustrating a typical TDD radio frame scheme, according to the prior art.
Figure 2:
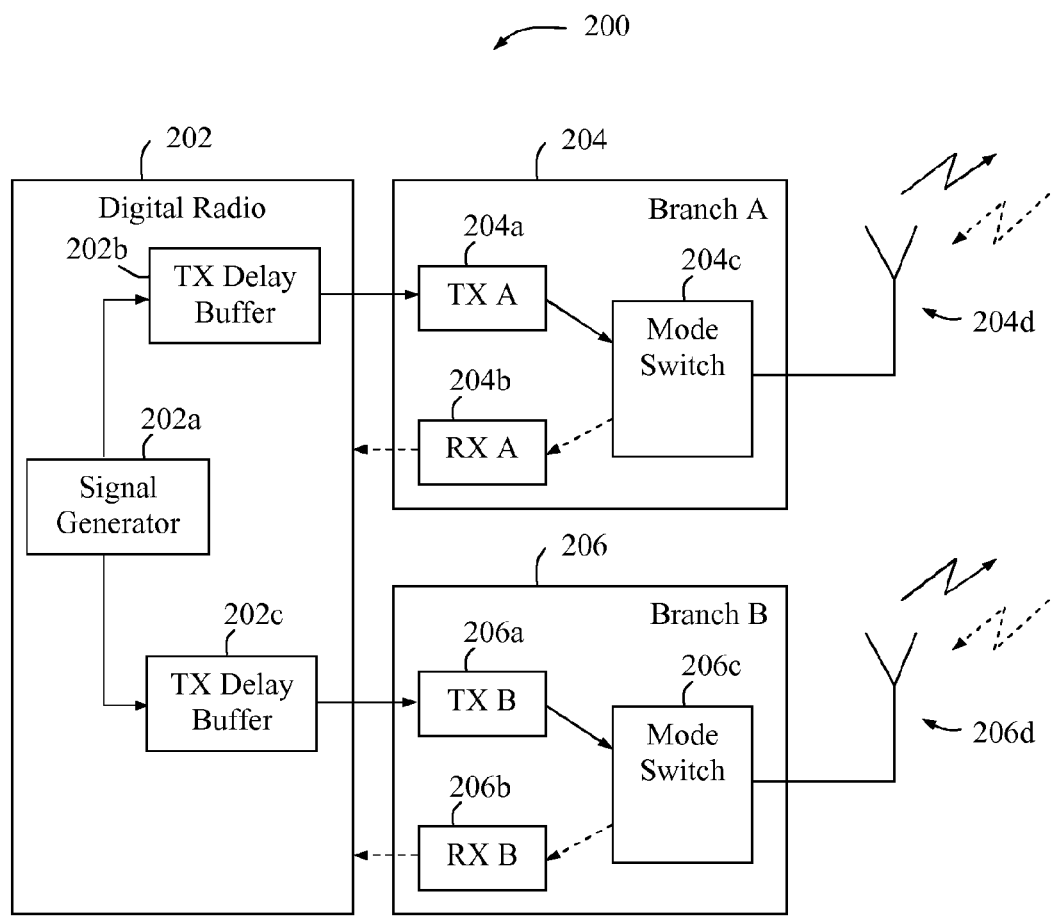
FIG. 2 is a block diagram illustrating a typical radio node with parallel branches and antennas, according to the prior art.
Figure 3:
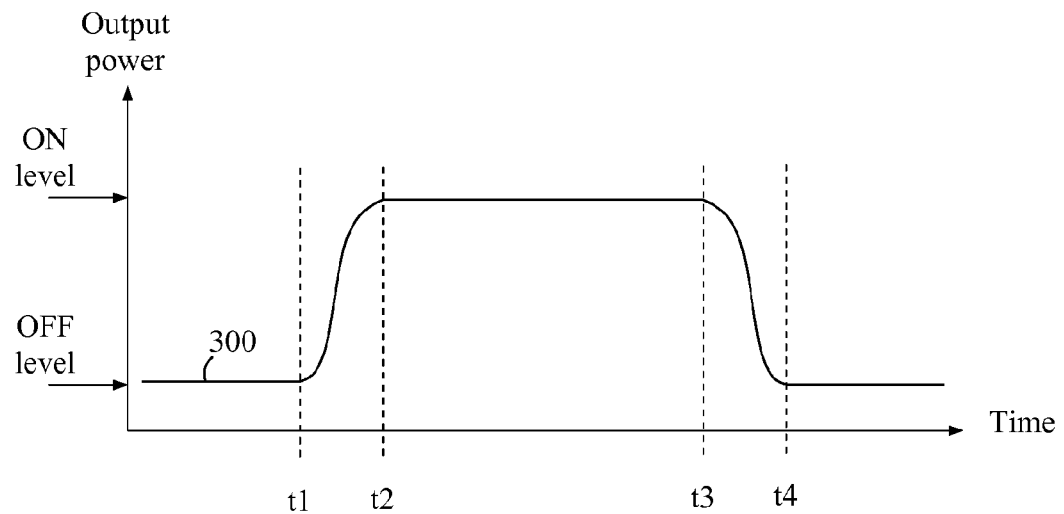
FIG. 3 is a diagram illustrating output power from a radio node when using TDD, according to the prior art.
Figure 4:
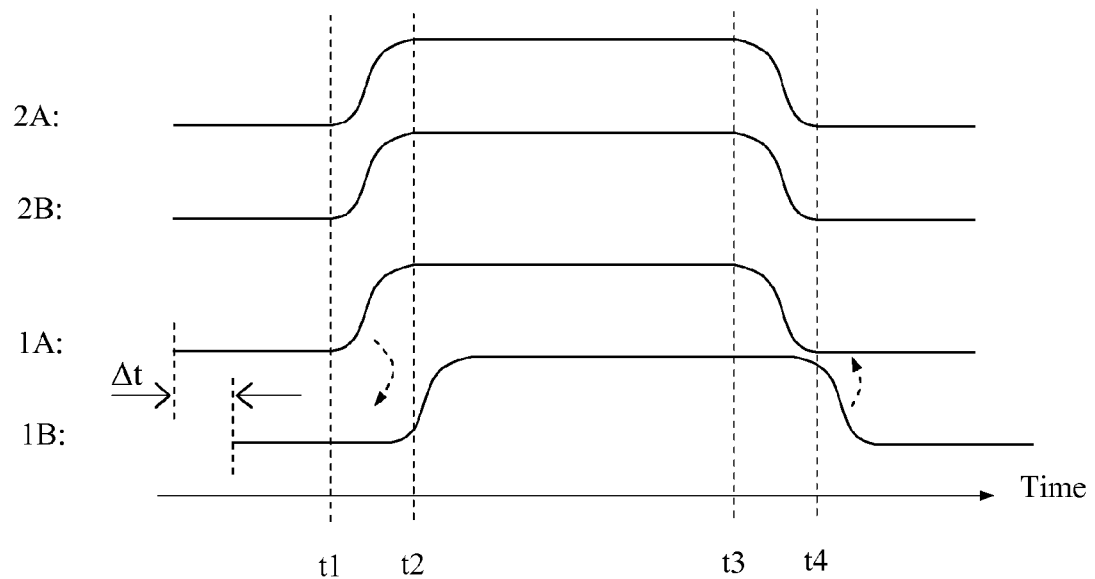
FIG. 4 is a diagram illustrating output power from multiple branches of a radio node when using TDD, according to the prior art.

As in FIG. 2, the radio node 600 comprises a digital radio part 602 with a signal generator 602a feeding signals to transmit delay buffers 602b, 602c coupled to respective branches 604 and 606. The signal generator 602a is adapted to generate a signal that propagates through the transmit chain in each of the branches 604, 606. In this solution, the radio node 600 further comprises tapping means 608 adapted to tap the generated signal from each of the branches at a position after the transmit chain, schematically indicated in the figure by a dashed circle after each branch.

Figure 7:
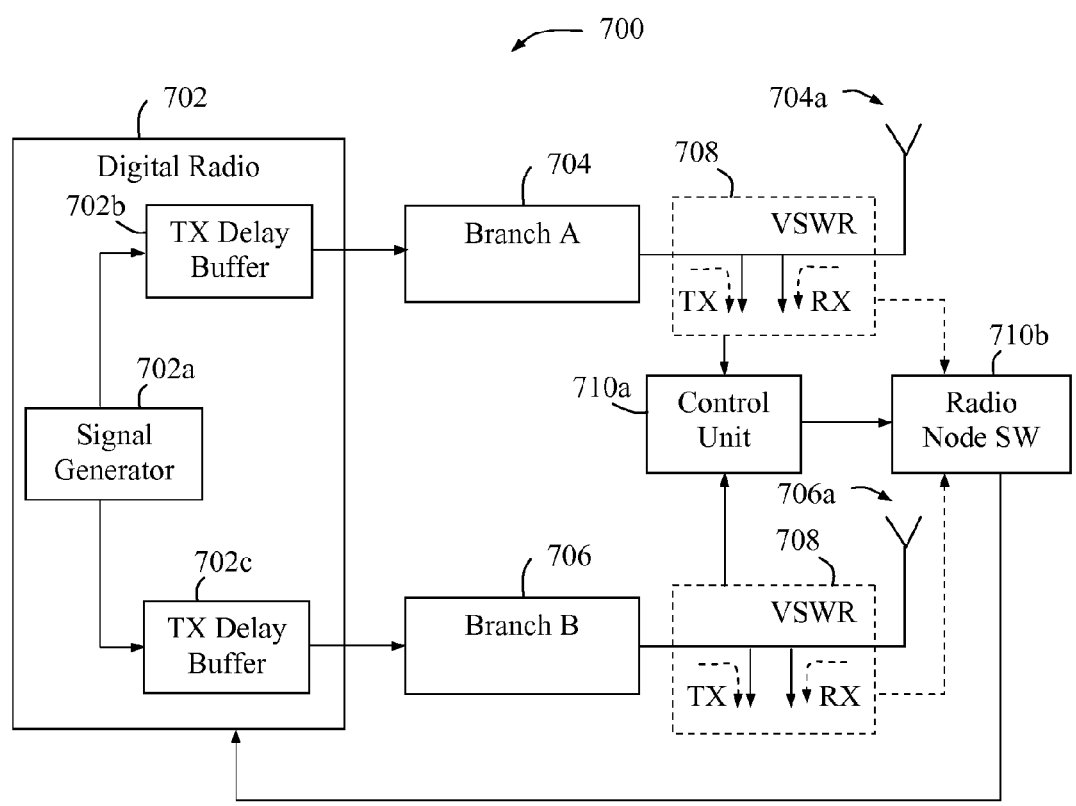
FIG. 7 is a block diagram illustrating another example of a radio node, according to further possible embodiments.
Figure 8:
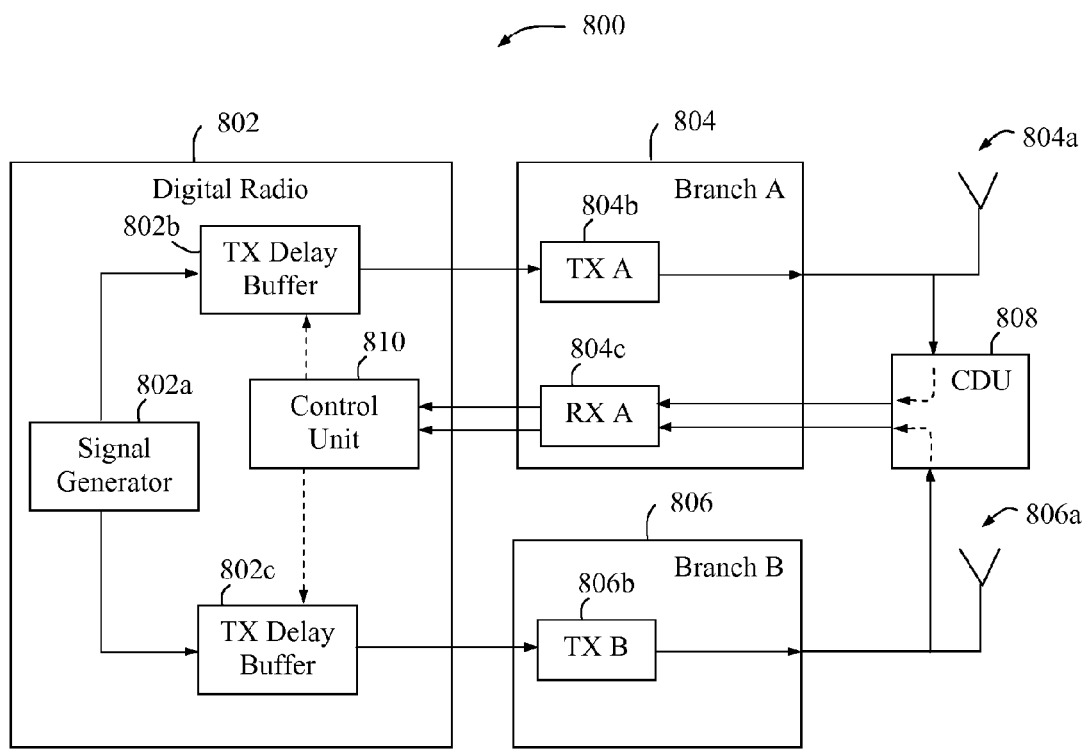
FIG. 8 is a block diagram illustrating yet another example of a radio node, according to further possible embodiments.

Some examples of how such tapping means can be realized in practice will be described in more detail further below with reference to FIGS. 7 and 8. In short, the signal can be tapped from the branches by means of a Voltage Stand Wave Radio, VSWR, supervision equipment coupled to each of the branches and producing a voltage difference between forward radio power and reverse radio power detected at each of the branches. Another possibility is that the generated signal is a test signal which is tapped from each of the branches by means of an antenna calibration equipment coupled to each branch and feeding the tapped test signal from each branch through a receive chain in one of the branches to a control unit.

Returning to FIG. 6, the radio node 600 also comprises a control unit 610 adapted to determine timing of tapped signals by determining a timing of the tapped signal from each of the branches, and to monitor timing alignment of the branches in the radio node based on the determined timing of tapped signals. The control unit 610 may be further adapted to adjust a transmission delay of at least one of the branches if the determined timing of tapped signals indicates that a timing misalignment between the branches 604 and 606 exceeds a preset limit, e.g. by altering at least one of the transmit delay buffers 602b and 602c coupled to branches 604 and 606, respectively, which is indicated by dashed arrows.

As in the example of FIG. 5, control unit 610 may need to adjust the transmission delay more than once, and check the resulting timing alignment between branches 604 and 606 after each adjustment, until the timing misalignment no longer exceeds the preset limit and is thereby acceptable. If the control unit 610 fails to reduce the timing misalignment to become acceptable in this way, the faulty branch may be shut down for repairs or replacement.

It should be noted that FIG. 6 merely illustrates various functional units or entities in the radio node 600 in a logical sense, although the skilled person is able to implement these functions in practice using suitable software and hardware means. Thus, this aspect of the solution is generally not limited to the shown structures of the radio node 600, and the functional units 602-610 may be configured to operate according to the features described for FIG. 5 above, and for FIGS. 7 and 8 below, where appropriate.

The control unit 610 described above can be implemented in the radio node 600 as program modules of a respective computer program comprising code means which, when run by a processor "P" causes the radio node to perform the above-described actions. The processor P may be a single Central Processing Unit (CPU), or could comprise two or more processing units. For example, the processor P may include general purpose microprocessors, instruction set processors and/or related chips sets and/or special purpose microprocessors such as Application Specific Integrated Circuits (ASICs). The processor P may also comprise a storage for caching purposes.

Each computer program may be carried by a computer program product in the radio node 600 in the form of a memory "M" connected to the processor P. The computer program product or memory M comprises a computer readable medium on which the computer program is stored. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the radio node 600.

A first example of how the above-described solution can be implemented in practice will now be described with reference to FIG. 7. Here, a TDD radio node 700 comprises a digital radio part 702 with a signal generator 702a feeding signals to transmit delay buffers 702b, 702c coupled to respective parallel transmit branches 704 and 706, such that the signals from each branch are emitted from respective antennas 704a and 706a, as similar to the radio node 600 described above with reference to FIG. 6.

In this example, The radio node 700 has tapping means adapted to tap a generated signal from the branches 704, 706 by means of a VSWR supervision equipment 708 coupled to each of the branches. The VSWR supervision equipment 708 is a known existing component as such, which can be re-used in this context to accomplish the present solution.

The configuration and function of a typical VSWR component are thus known as such but will be briefly outlined below to explain how it can be used for this embodiment. The VSWR supervision equipment 708 comprises two opposite directional couplers which are used to tap forward and reverse signals basically at a point where the antennas 704a, 706a are connected to branches 704 and 706, respectively. The directional couplers of equipment 708 are schematically indicated by dashed TX and RX arrows in the figure.

The VSWR supervision equipment 708 also comprises two so-called "Root Mean Square, RMS, power detectors" which convert the tapped forward and reverse signals into a voltage signal. An operational amplifier in equipment 708 further produces a voltage difference from the voltage signal which represents a "VSWR level", according to conventional VSWR technique. Thereby, the VSWR supervision equipment 708 can be arranged to produce a voltage difference between forward radio power and reverse radio power detected for each of the branches 704 and 706, using the above directional couplers, RMS power detectors and operational amplifier, which are not illustrated in detail in FIG. 7 for simplicity. The produced voltage difference, or VSWR level, is then provided to a "radio node software, SW" 710b, as shown by dashed arrows from 708 to 710a, for evaluation, which is however outside the scope of this solution.

In this solution, the forward signal tapped by the directional couplers and converted by the RMS power detectors in the VSWR equipment 708 at each branch, indicated by the TX arrows, is injected from each branch to a control unit 710a which determines a timing of the tapped signal from each branch, and monitors the timing alignment of the branches based on the above timing of tapped signals. The resulting timing alignment is provided to the radio node SW 710b in this example which may also be responsible for and adapted to initiate any adjustments of transmission delay in the digital radio part 702, as indicated by the arrow from 710b to 702, depending on the measured timing alignment provided from control unit 710a. Any adjustment of transmission delay for the branches can be performed as described above for FIGS. 5 and 6. This embodiment has the advantage of reusing hardware for VSWR supervision which is already developed and available.

A second example of how the above-described solution can alternatively be implemented in practice will now be described with reference to FIG. 8. As in the previous examples, a TDD radio node 800 comprises a digital radio part 802 with a signal generator 802a feeding signals to transmit delay buffers 802b, 802c coupled to respective branches 804 and 806, such that the signals from each branch are emitted from respective antennas 804a and 806a. As in the above examples, each branch 804, 806 includes a transmitter entity 804b and 806b, respectively, and a receiver entity 804c which is shown in branch 804 but not in branch 806 for simplicity.

In this example, the signal generator 802a generates a test signal and the tapping means of radio node 800 is realized by an antenna calibration equipment 808, being a so-called "Coupling and Distribution Unit, CDU", which is likewise a known existing component as such that can be utilized in this context to accomplish the present solution.

For a conventional TDD radio node supporting so-called "smart antenna" and having multiple branches and antennas like node 800, the transmit branches need to be calibrated due to any discrepancies that may be present in the different transmitter/receiver branches. Such discrepancies may involve differences in terms of gain and phase. If these discrepancies are not compensated for, they can seriously degrade the accuracy of a function called "Direction Of Arrival, DOA, estimation", and/or the performance of beam forming and thereby cell coverage and capacity. The above-mentioned known CDU component is commonly used for such antenna calibration, which is thus known in this field and outside the scope of this solution. In the example of FIG. 8, the CDU 808 is also utilized in the present solution for tapping the test signal from each branch and to feed the tapped signals to a control unit 810, as follows.

The CDU 808 is coupled to each branch 804, 806 and is arranged to tap the test signal from each branch and to feed the tapped test signals through a receive chain in one of the branches 804, including the receiver 804c, to the control unit 810, here schematically shown located in the digital radio part 802. In practice, the control unit 810 may be integrated in radio part 802 or otherwise connected thereto.

In this example, the tapped test signal from both branches is injected by CDU 808 to the receive chain 804c of branch 804 and is fed further on to the control unit 810 by means of various switches, not shown, in the receive chain 804c of branch 804. However, the test signal may alternatively be fed through the receive chain of the other branch 806 just as well, or generally any branch of a radio node with multiple parallel branches. Since both signals from branches 804, 806 propagate through the same receive chain, no further timing misalignment will be introduced here. Thereby, the control unit 810 is able to determine timing of the tapped test signals by determining a timing of the tapped signal from each branch 804, 806 when received from the receive chain 804c of branch 804, and to monitor timing alignment of the branches in the radio node 800 based on the determined timing of tapped signals.

This embodiment has the advantage of not requiring any extra hardware equipment if the CDU 808 is installed and used for antenna calibration anyway. Further, if the radio node 800 has a Tower Mounted Amplifier, TMA, the calibration path will also include that TMA such that any timing misalignment caused by the TMA can be discovered and measured by means of this embodiment.

When using this solution according to any of the embodiments described above, the following advantages may be achieved. Any unacceptable timing misalignment between branches in a radio node with multiple parallel branches and antennas can be easily discovered and any degradation of performance or equipment damages due to such misalignment can be avoided by performing the above-described check from time to time. This check may be performed according to a preset checking scheme, or in response to detecting some malfunction in the radio node such as abnormal Acknowledge/Non-Acknowledge reporting, ACK/NACK, or deterioration of received Signal-to-Noise Ratio, SNR.

While the solution has been described with reference to specific exemplary embodiments, the description is generally only intended to illustrate the inventive concept and should not be taken as limiting the scope of the solution. For example, the terms "transmit branch", "signal generator", "mode switch", "tapping means" and "control unit" have been used throughout this description, although any other corresponding nodes, functions, and/or parameters could also be used having the features and characteristics described here. The solution is defined by the appended claims.

The invention claimed is:

1. A method for controlling performance in a radio node using Time Division Duplex (TDD) and having multiple parallel branches and antennas for radio transmission of signals propagating through a transmit chain in each of the branches before emission from the antennas, the method comprising:
generating a single signal from a single source that propagates through said transmit chain in each of the branches;
tapping said single signal, before said single signal is emitted from the antennas, from each of the branches after the transmit chain to acquire tapped signals of the single signal;
determining a timing of the tapped signals of the single signal by determining a timing of the tapped signals of the single signal from each of the branches; and
monitoring a timing alignment of said branches in the radio node based on the determined timing of the tapped signals of the single signal.

2. The method according claim 1, further comprising: adjusting a transmission delay of at least one of the branches when the determined timing of the tapped signals of the single signal indicates that a timing misalignment between said multiple parallel branches exceeds a preset limit.

3. The method according to claim 2, wherein adjusting the transmission delay comprises altering a transmit delay buffer coupled to said at least one of the branches.

4. The method according to claim 2 further comprising: shutting down said at least one of the branches, if the timing misalignment still exceeds the preset limit after said adjusting of transmission delay.

5. The method according to claim 4, further comprising: issuing an alarm when the timing misalignment exceeds the preset limit.

6. The method according to claim 2, further comprising: issuing an alarm when the timing misalignment exceeds the preset limit.

7. The method according to claim 2, wherein said single signal is tapped from the branches by a Voltage Stand Wave Radio (VWSR) supervision equipment coupled to each of the branches and producing a voltage difference between forward radio power and reverse radio power detected at each of the branches.

8. The method according to claim 2, wherein the generated single signal is a test signal that is tapped from each of the branches by an antenna calibration equipment being coupled to each of said branches and feeding the tapped test signal from each branch through a receive chain in one of the branches to a control unit.

9. The method according to claim 1, wherein said single signal is tapped from the branches by a Voltage Stand Wave Radio (VWSR) supervision equipment coupled to each of the branches and producing a voltage difference between forward radio power and reverse radio power detected at each of the branches.

10. The method according to claim 1, wherein the generated single signal is a test signal that is tapped from each of the branches by antenna calibration equipment being coupled to each of said branches and feeding the tapped test signal from each branch through a receive chain in one of the branches to a control unit.

11. A radio node configured to use Time Division Duplex (TDD) and having multiple parallel branches and antennas for radio transmission of signals propagating through a transmit chain in each of the branches before emission from the antennas, the radio node comprising:
a signal generator configured to generate a single signal that propagates through said transmit chain in each of the branches;
a signal tapper configured to tap said single signal, before said single signal is emitted from the antennas, from each of the branches after the transmit chain to acquire tapped signals of the single signal; and a control unit configured to:
- determine a timing of the tapped signals of the single signal by determining a timing of the tapped signals of the single signal from each of the branches; and
- monitor a timing alignment of said branches based on the determined timing of the tapped signals of the single signal.

12. The radio node according to claim 11, wherein the control unit is further configured to adjust a transmission delay of at least one of the branches when the determined timing of the tapped signals of the single signal indicates that a timing misalignment between said multiple parallel branches exceeds a preset limit.

13. The radio node according to claim 12, wherein adjusting the transmission delay comprises altering a transmit delay buffer coupled to said at least one of the branches.

14. The radio node according to claim 12, the control unit being further configured to shut down said at least one of the branches, if the timing misalignment still exceeds the preset limit after said adjusting of transmission delay.

15. The radio node according to claim 14, the control unit being further configured to issue an alarm when the timing misalignment exceeds the preset limit.

16. The radio node according to claim 12, the control unit being further configured to issue an alarm when the timing misalignment exceeds the preset limit.

17. The radio node according to claim 12, wherein the signal tapper is further configured to tap said single signal from the branches by a Voltage Stand Wave Radio (VWSR) supervision equipment coupled to each of the branches and producing a voltage difference between forward radio power and reverse radio power detected at each of the branches.

18. The radio node according to claim 12, wherein the generated single signal is a test signal and the signal tapper comprises:
- an antenna calibration equipment being coupled to each of said branches and feeding the tapped test signal from each branch through a receive chain in one of the branches to the control unit.

19. The radio node according to claim 11, wherein the signal tapper is further configured to tap said single signal from the branches by Voltage Stand Wave Radio (VWSR) supervision equipment coupled to each of the branches and producing a voltage difference between forward radio power and reverse radio power detected at each of the branches.

20. The radio node according to claim 11, wherein the generated single signal is a test signal and the signal tapper comprises:
- an antenna calibration equipment being coupled to each of said branches and feeding the tapped test signal from each branch through a receive chain in one of the branches to the control unit.

* * * * *